(12) United States Patent
Mickey et al.

(10) Patent No.: US 10,023,425 B2
(45) Date of Patent: Jul. 17, 2018

(54) DEVICE AND SYSTEM TO STORE, MANEUVER AND PAY-OUT MATERIAL STORED ON REELS

(71) Applicant: Cerro Wire LLC, Hartselle, AL (US)

(72) Inventors: Stephen E. Mickey, Hartselle, AL (US); Kevin L. Dalrymple, Hartselle, AL (US); Jeffery D. Kennedy, Joppa, AL (US)

(73) Assignee: CERRO WIRE LLC, Hartselle, AL (US)

( * ) Notice: Subject to any disclaimer, the term of this patent is extended or adjusted under 35 U.S.C. 154(b) by 0 days.

(21) Appl. No.: 15/266,789

(22) Filed: Sep. 15, 2016

(65) Prior Publication Data

US 2017/0081147 A1    Mar. 23, 2017

Related U.S. Application Data

(60) Provisional application No. 62/219,951, filed on Sep. 17, 2015.

(51) Int. Cl.
*B65H 49/38* (2006.01)
*B60P 3/035* (2006.01)

(52) U.S. Cl.
CPC .............. *B65H 49/38* (2013.01); *B60P 3/035* (2013.01); *B62B 2202/025* (2013.01)

(58) Field of Classification Search
CPC .... B65H 49/38; B60P 3/035; B62B 2202/025
See application file for complete search history.

(56) References Cited

U.S. PATENT DOCUMENTS

| 3,152,772 | A | * | 10/1964 | Schjerven | B21C 47/24 242/403.1 |
| 4,784,221 | A | * | 11/1988 | Share | B65H 54/74 166/52 |
| 9,004,392 | B1 | | 4/2015 | Bigbee, Jr. et al. | |
| 2015/0321876 | A1 | | 11/2015 | Galindo Gonzalez et al. | |

OTHER PUBLICATIONS

Graybar, Introducing Graybar SmartReel Wire Pulls Have Never Been This Easy!, Jul. 15, 2016, www.graybar.com/smartreel, St. Louis, Missouri.

* cited by examiner

*Primary Examiner* — William E Dondero
(74) *Attorney, Agent, or Firm* — Levenfeld Pearlstein, LLC

(57) ABSTRACT

A system to store, maneuver and pay-out material stored on reels, which reels have a central hub and a pair of reel flanges, includes a shaft for positioning through a center of the hub and a pair of flanges. The flanges are mountable to the shaft on opposite sides of the reel. Each flange is mounted to the shaft for rotation independent of the other flange and independent of the shaft. Each flange has a loading assembly for moving the shaft from a loading/unloading position eccentric of the flange to a loaded position concentric with the flange.

9 Claims, 3 Drawing Sheets

DEVICE AND SYSTEM TO STORE, MANEUVER AND PAY-OUT MATERIAL STORED ON REELS

CROSS-REFERENCE TO RELATED APPLICATION DATA

This application claims the benefit of and priority to Provisional U.S. Patent Application Ser. No. 62/219,951, filed Sep. 17, 2015, the entirety of the disclosure of which is incorporated herein by reference.

BACKGROUND

Wire and cable (collectively, wire) as well as a variety of other elongate products and materials are packaged on reels fabricated from steel, plastic, cardboard, wood and the like. The reels include a central hub with a pair of flanges fixedly mounted on either side of the hub. Reels wound full with material can often weigh between 1000 lbs and 10,000 lbs. These reels are transported to job sites and stored without any way in which they can be moved from the storage area or around the job site other than by using a forklift or other tractor, or rolling the reels.

This can be problematic as installing these materials requires that the reels of material be moved to the location where they will be installed. Moving the reels to these locations often requires that the reels be transported across rough or unfinished ground, across floors littered with debris, and through hallways and doorways. When working in large, open spaces this is not an impediment, in that forklifts can be used to secure, lift and move the reels. However, when a forklift is not an option, for example in a confined space, large reels can require three to four (or more) workers to maneuver and move such reels around a job-site location.

Because of weight and friction it can be very difficult if not impossible to turn, e.g., reorient or rotate, not roll a 1000+ lb reel on a dirt or concrete surface. Accordingly, a reel may have to be rolled back and forth, as it is turned in order to reorient the reel. Again, this can be a time and labor intensive exercise that may have to be carried out numerous times a day to facilitate installation of the material stored on the reel.

Accordingly, there is a need for a device and system that allows for storing and paying out material from a reel. Desirably, such a system provides ready maneuverability of a full reel, whether moving from one location to another or reorienting the reel in-place. More desirably still, such a device and system can allow a single user to reorient and/or move a full reel without the assistance of others. Still more desirably, such a system allows for readily loading and unloading a reel from the system without the use of lifting equipment, such as forklifts and the like.

SUMMARY

Various embodiments of the present disclosure provide a device and system that mounts to a reel with two independently rotating flanges, allowing the reel to turn easily in a limited space, e.g., rotate or reorient in-place, and allows for readily moving the reel from one location to another. The system and device are used with reels of material having a central hub and a pair of flanges.

The system to store, maneuver and pay-out material stored on reels includes a shaft for positioning through a center of the hub and a pair of flanges. Each of the flanges is mountable to the shaft on opposite sides of the reel. Each flange is mounted to the shaft for rotation independent of the other flange and independent of the shaft. Each flange has a loading assembly for moving the shaft from a loading/unloading position eccentric of the flange to a loaded position concentric with the flange.

The system can include a bearing assembly associated with each flange, configured such that the shaft is received in the bearing assemblies. The bearing assemblies move between the position eccentric of the flange (the loading/unloading position) to the position concentric with the flange (the loaded position).

The loading assembly can include a track in each flange. The track has a first end at a center of the flange a second end spaced from the center of the flange. The loading assembly is at the first end of the track when in the loaded position.

The system can include a latch for locking the loading assembly in the loaded position. A latch release released the latch from the locked condition. A damper can operably connect the shaft to at least one of the pair of flanges. The damper dampens movement of the shaft between the loading/unloading position and the loaded position. In an embodiment the damper is a cylinder, such as a pneumatic or a hydraulic cylinder. Dampers can operably connect the shaft to both of the flanges.

In an embodiment the track has an arcuate shape curving between the first and second ends.

These and other features and advantages of the present disclosure will be apparent from the following detailed description, in conjunction with the appended claims.

DETAILED DESCRIPTION

Figure 1:
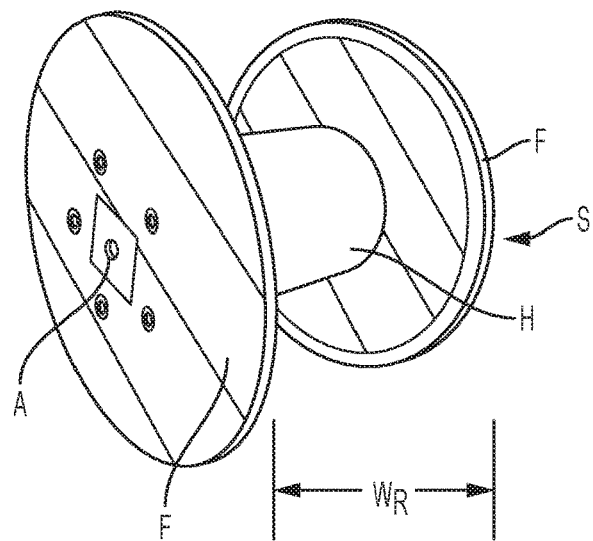
FIG. 1 is perspective view of an example of a spool with which the present device and system to store, maneuver and pay-out material that is stored on reels is used.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 3:
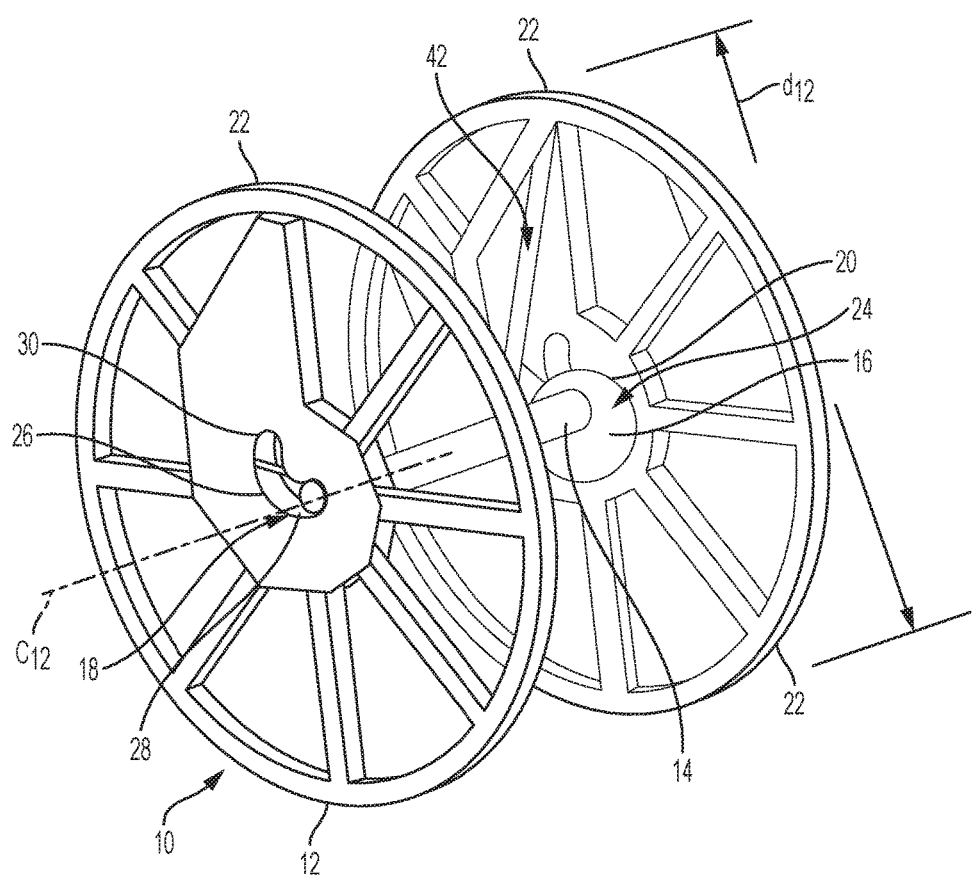
FIG. 3 is a perspective illustration of an alternate embodiment of the device and system.
Figure 4:
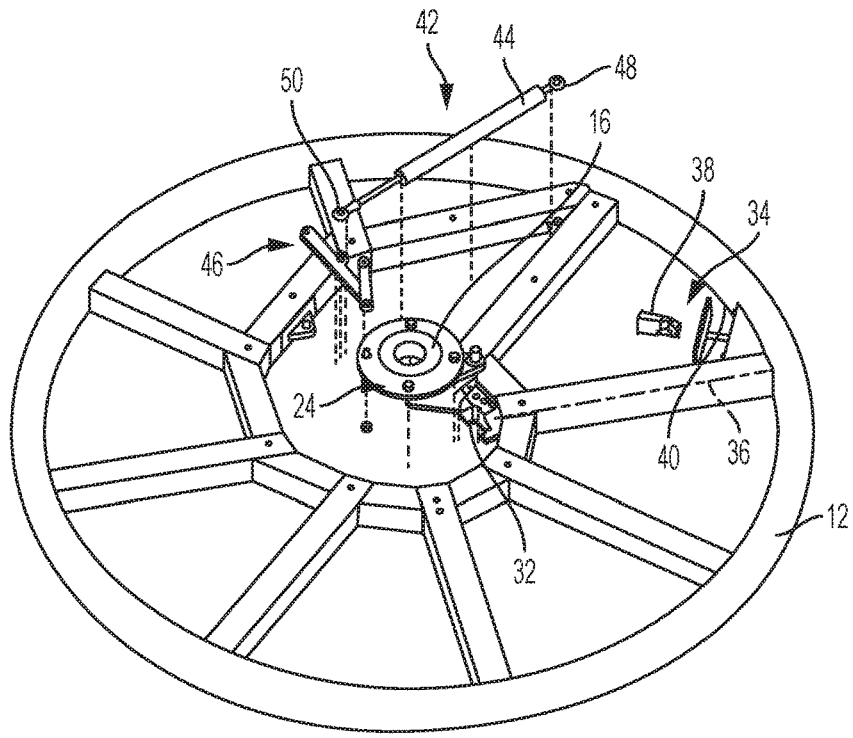
FIG. 4 is a partial exploded view of one flange of the device and system of FIG. 3, illustrating the loading assembly, dampening assembly and latching assembly associated with the illustrated flange.
Figure 5:
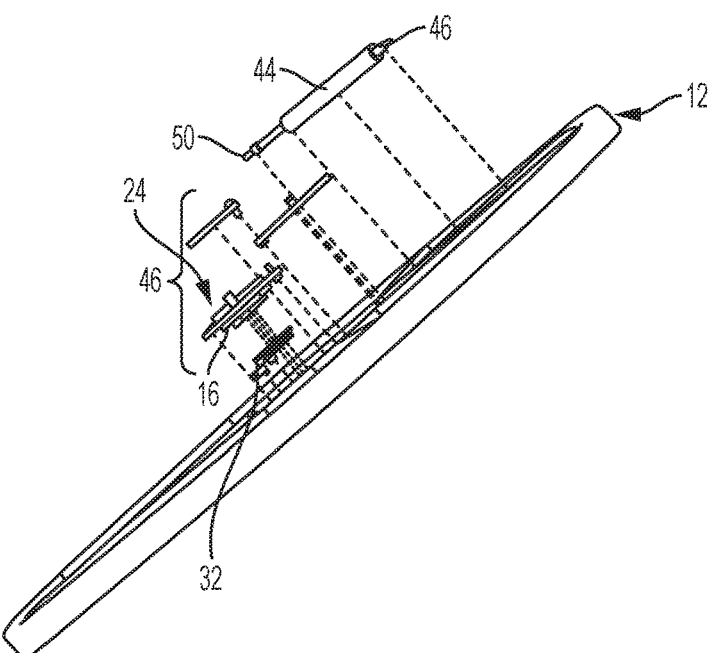
FIG. 5 is a partially exploded side view of the flange and components of FIG. 4

Referring now to the figures and in particular to FIGS. 3-5 there is shown an example of an embodiment of a device 10 and system to store, maneuver and pay-out material that is stored on reels R. For purposes of the present disclosure, as will be recognized by those skilled in the art, a wide variety of materials can be stored on reels R. Such reels are likewise available in a wide variety of sizes. Two common sizes of reels for building wire (e.g., wire W used in the construction of buildings and other industrial, commercial and residential facilities), are 40 inch diameter and 48 inch diameter reels R.

Figure 2:
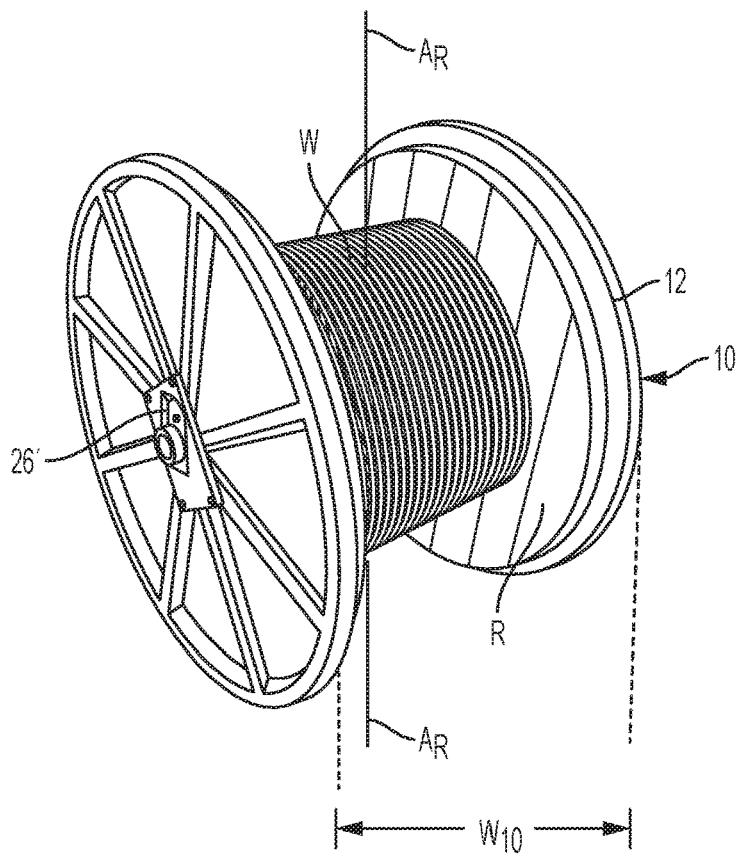
FIG. 2 is an illustration of a reel of wire installed on an embodiment of the device and system.

Also for purposes of the present disclosure, and referring to FIGS. 1 and 2, the member on which the elongate material, e.g., the wire W, is stored is referred to as a spool S. The spool S has a central hub H and a pair of opposing spool flanges F. The flanges F are fixed to the hub H. The spool S, with the elongate material W thereon is referred to as a reel R, e.g., a reel R of wire.

The present device 10 to store, maneuver and pay-out material that is stored on reels R includes generally, a pair of flanges 12 and a central shaft 14. The shaft 14 is operably mounted to the flanges 12 and the flanges 12 and shaft 14 rotate freely of each other. That is, the flanges 12 rotate freely of the shaft 14 and independent of each other and the shaft 14 rotates freely of the flanges 12. In a present embodiment, the device 10 includes at least a pair of bearings 16, one bearing associated with each flange 12 as mounted to the shaft 14. The device 10 may include a pair of bearings 16 (e.g., inboard and outboard bearings, not shown) for mounting each flange 12 to the shaft 14. With or without the bearings 16, the flanges 12 rotate independently of each other about the shaft 14, and rotate independently of the shaft 14. This arrangement permits the device 10, with a stored reel R, to be moved forward and rearward, to be rotated in place, that is, rotated about a vertical axis $A_R$ extending through the reel R and device 10 as well as permits the reel R to be rotated about the shaft 14 (the shaft being positioned in an arbor hole A of the reel), to pay-out material W on the reel R. As will be understood from the present disclosure, the flanges 12 can be identical to one another or can be mirror images of one another.

It will be appreciated that when the device 10 (with the reel R thereon) is moved forward or rearward, both flanges 12 rotate in the same direction, whereas when the device 10 is rotated about the vertical axis $A_R$, the flanges 12 rotate in opposite directions (so that the device 10 does not move forward or rearward, but spins in place), and when the material W is paid out from the reel R, the device 10 can remain stationary.

It will also be appreciated that in order to effect the ready maneuverability of the reel R on the device 10, the device flanges 12 must be larger than the spool flanges F so that the spool flanges F are elevated off of the ground or other surface (see, for example, FIG. 2). As discussed above spools S with flanges F of differing diameters are used in a variety of industries; however, for building wire, spools of 40 inch and 48 inch diameters are common. Accordingly, in an exemplary device 10 for use with building wire W, the flanges 12 have a diameter of about 50 inches to accommodate this "lift" of the spool flanges F (and thus the reel R) off of the ground.

In order to "lift" the reel R off of the ground and to center the reel R within the device 10, the device 10 includes a loading or pivoting bearing assembly 18. The loading assembly 18 includes a receiver 20 that receives the shaft 14 in an eccentric location relative to the flanges 12 and moves the shaft 14 to a concentric location relative to or on the flanges 12. That is, the shaft 14 is received in the loading assembly 18 at a location between the center $C_{12}$ of the flanges 12 and the periphery of the flanges (as indicated at 22) and allows for movement of the shaft 14 from that eccentric position to the center $C_{12}$ of the flanges 12. Conversely, the loading assembly 18 also allows for movement of the shaft 14 from the center $C_{12}$ of the flanges 12 to a location between the center $C_{12}$ of the flange 12 and the periphery 22 of the flanges 12 (e.g., to an eccentric location). In practical effect, this arrangement allows the reel R to be loaded onto the device 10 when the reel R is resting on the ground, and the reel R moved to center the reel R on the flanges 12 (in the device 10). Conversely, the loading assembly 18 also allows for readily unloading the reel R from the device 10, by moving the reel R (via the shaft 14) away from the center $C_{12}$ of the flanges 12 to allow the reel R to rest on the ground.

In a present embodiment, the loading assembly 18 includes a shaft receiving member, which in the present embodiment is a bearing assembly 24, a channel or track 26 in the flanges 12 in which the bearing assembly 24 is received and within which the bearing assembly 24 moves. In an embodiment, the track 26 is a channel having one end 28 at the center $C_{12}$ of it respective flange 12, and another end 30 spaced from the center $C_{12}$, between the center $C_{12}$ and the flange periphery 22. The bearing assembly 24 moves through the track 26 between the first and second ends 28, 30 of the track 26. The track 26' can be straight as illustrated in FIG. 2 or the track 26 can be arcuate as shown in FIG. 3.

It will be appreciated by those skilled in the art that this configuration allows for positioning the shaft 14 through the reel R and into the flanges 12 (via the bearing assemblies 24) while the reel R is positioned on the ground. In this position, the shaft 14 (and bearing assemblies 24) will be eccentric relative to the flanges 12; that is, the shaft 14 (and bearing assemblies 24) will be at or near the non-centered or eccentric end 30 of the track 26. By rolling the device 10 and the reel R, the shaft 14 (and bearing assemblies 24) will move along the track 26 to a loaded position in which the shaft 14 and bearing assemblies 24 are in the centered or concentric end 28 of the track 26. When in this position, the reel flanges F are raised from the ground and the reel R is concentric with the flanges 12.

In order to maintain the shaft 14 and bearing assemblies 24 in the loaded or concentric position, the device 10 can include a latching assembly 32 that locks the shaft 14, via the bearing assemblies 24 in place, once the bearing assemblies 24 are in the loaded position. In an embodiment, the device 10 includes a rotating latch that engages and locks each bearing assembly 24 when in the loaded position. The latch 32 can be located near the flange center $C_{12}$, adjacent to the loaded position of the respective bearing assemblies 24.

To release the latches 32, the device 10 can include latch releases 34. An embodiment of a latch release 34 includes a cable 36 extending from the latch 32 to a position at about the inside of the flange 12. In a present embodiment, a latch release button 38, such as a mechanical push button, is located on an inner surface 40 of the flange 12. Latches 32 and latch releases 34 can be positioned on both of the flanges 12 so that both latches 32 must be released in order to release the reel R from the loaded position.

In an embodiment, movement of the reel R between the non-centered and centered (loaded) positions can be controlled so that the movement of the reel R (e.g., movement of the bearing assemblies 24 and shaft 14) is damped. One way in which damped movement can be carried out is by use of a dampener 42, such as a cylinder 44 and linkage arrangement 46, such as that illustrated in FIGS. 4 and 5. In this configuration, one end 48 of the cylinder 44 is pivotally mounted to the flange 12, and a second end 50 of the cylinder 44 is mounted to the linkage 46. The linkage 46 is operably mounted to the flange 12 and to the bearing assembly 24. In this manner, movement of the bearing assembly 24 along the track 26 is slowed (dampened) by the resistance provided by the extending and retracting cylinder 44.

It will be understood from a study of the figures that the present system and device 10 can be configured in a low profile such that a minimal amount of space is required beyond the outside of the spool flanges F. That is, the loading assembly 18, dampening assembly 42 and latching assembly 32 can be configured so that when the flanges 12 are installed on the reel R, the width of the assembled components adds minimally to the width $W_R$ of the reel R. In a present embodiment when used with a reel R having a width $W_R$ across the outside faces of the spool flanges F of about 28 inches, the overall width $W_{10}$ across the outside faces of the device flanges 12 is about 34 inches, which allows the device 10 (with the mounted reel R) to move through standard building doorways.

It will also be appreciated by those skilled in the art that the present device 10 and system to store, maneuver and pay-out material W that is stored on reels R provides significant and substantial advantages over known and presently used systems. For example, the free-wheeling or independent rotation of the reel R relative to the flanges 12 allows the device 10 with a reel R loaded thereon to be rotated about the shaft 14 to pay-out material W from the reel R. Because the spool flanges F are elevated or raised from the ground, the reel R can be readily rotated around the shaft 14 to pay-out material W.

Moreover, because the flanges 12 rotate independent of each other and independent of the shaft 14, the device 10 (with the reel R installed) can be rotated in place about a vertical axis $A_R$ through the reel R. That is, the device 10 (again, with the reel R) can be spun in place without being moved forward or rearward. This allows for readily reorienting the reel R, for example, turning the device 10 and reel R 90 degrees, allowing it to be turned very easily in very tight spaces, for example, to move from a hallway through a doorway.

Again, because of the low width profile, e.g., the width across the outside faces of the flanges $W_{10}$, the present design allows the device 10 with the reel R mounted thereon, to fit through a three foot wide, or narrower doorway. As such, it can be moved through buildings that have hallways and doorways that already exist or are under construction.

Further, the loading assembly 18 permits readily loading and unloading reels R onto the device 10 with less labor—it is anticipated that most reels R can be loaded and unloaded by one to two workers—than known systems.

Other features of the present device 10 that will be appreciated by those skilled in the art include reusability of the device; that is, the device 10 can be removed from a reel R and reused with other reels and various shaft 14 lengths to accommodate different widths of reels R. Moreover, other embodiments of the device can use larger or smaller diameter flanges 12 to accommodate other diameters of reels R.

The materials of the flanges 12 can also vary depending upon the anticipated use. For example, polymeric materials may be used, e.g., for corrosion resistance, as may metals such as steel for strength or aluminum for weight considerations. The reels can also be coated, again, for example for corrosion resistance or high visibility. In addition, tread may be used on the flange perimeter to facilitate use in open areas, such as graded or ungraded construction sites.

Moreover, when used with heavy reels, a load assist (not shown) can be incorporated into, for example, the dampening assembly 42. One contemplated load assist uses a pneumatic ram with a compressed gas cylinder to provide the motive force to move the reel R to the centered or loaded position.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A system to store, maneuver and pay-out material stored on reels, the reels having a central hub and a pair of reel flanges, the system comprising:
   a shaft for positioning through a center of the hub; and
   a pair of flanges, each of the flanges mountable to the shaft on opposite sides of the reel, each flange mounted to the shaft for rotation independent of the other flange and independent of the shaft, each flange having a loading assembly for moving the shaft from a loading/unloading position eccentric of the flange to a loaded position concentric with the flange, each loading assembly including a track in each flange, each track having a first end at a center of the flange a second end spaced from the center of the flange, wherein the loading assembly is at the first end in the loaded position, and wherein the track has an arcuate shape curving between the first and second ends.

2. A system to store, maneuver and pay-out material stored on reels, the reels having a central hub and a pair of reel flanges, the system comprising:
   a shaft for positioning through a center of the hub; and
   a pair of flanges, each of the flanges mountable to the shaft on opposite sides of the reel, each flange mounted to the shaft for rotation independent of the other flange and independent of the shaft, each flange having a loading assembly for moving the shaft from a loading/unloading position eccentric of the flange to a loaded position concentric with the flange, each loading assembly including a bearing assembly and wherein the shaft is received in the bearing assembly each loading assembly including a track in each flange, each track having a first end at a center of the flange a second end spaced from the center of the flange, wherein the loading assembly is at the first end in the loaded position, and wherein the track has an arcuate shape curving between the first and second end.

3. The system of claim 2 wherein the bearing assembly moves between the position eccentric of the flange to the position concentric with the flange.

4. The system of claim 2 including a latch for locking the loading assembly in the loaded position.

5. The system of claim 4 including a latch release to release the latch from the locked condition.

6. The system of claim 2 including a damper operably connecting the shaft to at least one of the pair of flanges.

7. The system of claim 6 wherein the damper dampens movement of the shaft between the loading/unloading position and the loaded position.

8. The system of claim 7 wherein the damper is a cylinder.

9. The system of claim 6 including dampers operably connecting the shaft to both of the flanges.

* * * * *